United States Patent
Hauser

(10) Patent No.: US 6,408,839 B1
(45) Date of Patent: Jun. 25, 2002

(54) WIRE SAWING DEVICE FOR CUTTING FINE SLICES USING ANGULAR CROSSING OF AT LEAST TWO SAWING YARN LAYERS

(75) Inventor: Charles Hauser, Genolier (CH)

(73) Assignee: HCT Shaping Systems SA, Cheseaux (CH)

( * ) Notice: Subject to any disclaimer, the term of this patent is extended or adjusted under 35 U.S.C. 154(b) by 0 days.

(21) Appl. No.: 09/622,198

(22) PCT Filed: Jan. 25, 1999

(86) PCT No.: PCT/IB99/00097

§ 371 (c)(1),
(2), (4) Date: Aug. 14, 2000

(87) PCT Pub. No.: WO99/41034

PCT Pub. Date: Aug. 19, 1999

(30) Foreign Application Priority Data

Feb. 13, 1998 (CH) .................................... 364/98

(51) Int. Cl.[7] .............................................. B28D 1/06
(52) U.S. Cl. ................................ 125/16.02; 125/16.01; 125/21
(58) Field of Search .................. 125/12, 16.01, 125/16.02, 19, 21

(56) References Cited

U.S. PATENT DOCUMENTS 3,155,087 A * 11/1964 Dreyfus
5,609,148 A * 3/1997 Mitwalsky et al. ...... 125/16.01
5,907,988 A * 6/1999 Kiuchi et al. .............. 83/651.1
6,041,766 A * 3/2000 Vojtechovsky ........... 125/16.02
6,109,253 A * 8/2000 Ikehara ......................... 125/12
6,234,159 B1 * 5/2001 Egglhuber ................ 125/16.02

FOREIGN PATENT DOCUMENTS

| JP | 55070545 | 5/1980 |
|---|---|---|
| JP | 62251062 | 10/1987 |
| WO | WO 9112915 | 9/1991 |
| WO | WO 9732681 | 9/1997 |
| WO | WO 9850209 | 11/1998 |

* cited by examiner

Primary Examiner—Timothy V. Eley
(74) Attorney, Agent, or Firm—Young & Thompson

(57) ABSTRACT

The invention concerns a wire sawing device comprising at least a support table (35) bearing a piece to be sawed (34) urged against the set of wires layer (26, 27) two outer wire-guide rolls (10, 11) powered by motors (14, 15) and at least two inner wire-guide rolls (16, 17). The wire (18) is wound on the wire-guide rolls so as to constitute between the inner wire-guide rolls (16, 17) two cross sets of wires (26, 27) whereof the projecting wires are parallel and at a distance from a first space (31) and so as to be returned by the outer wire-guide rolls (10, 11) whereon is provided a second space (30) twice the first space (31). Such an arrangement enables a balanced distribution of forces on the inner wire-guides (16, 17), the surfaces of the sawed slices to be perfectly parallel, the shearing forces on the piece to be sawed (34) to be reduced, a decrease in the cutting pressure, a greater cutting speed and to improve the precision of the resulting slices.

14 Claims, 4 Drawing Sheets

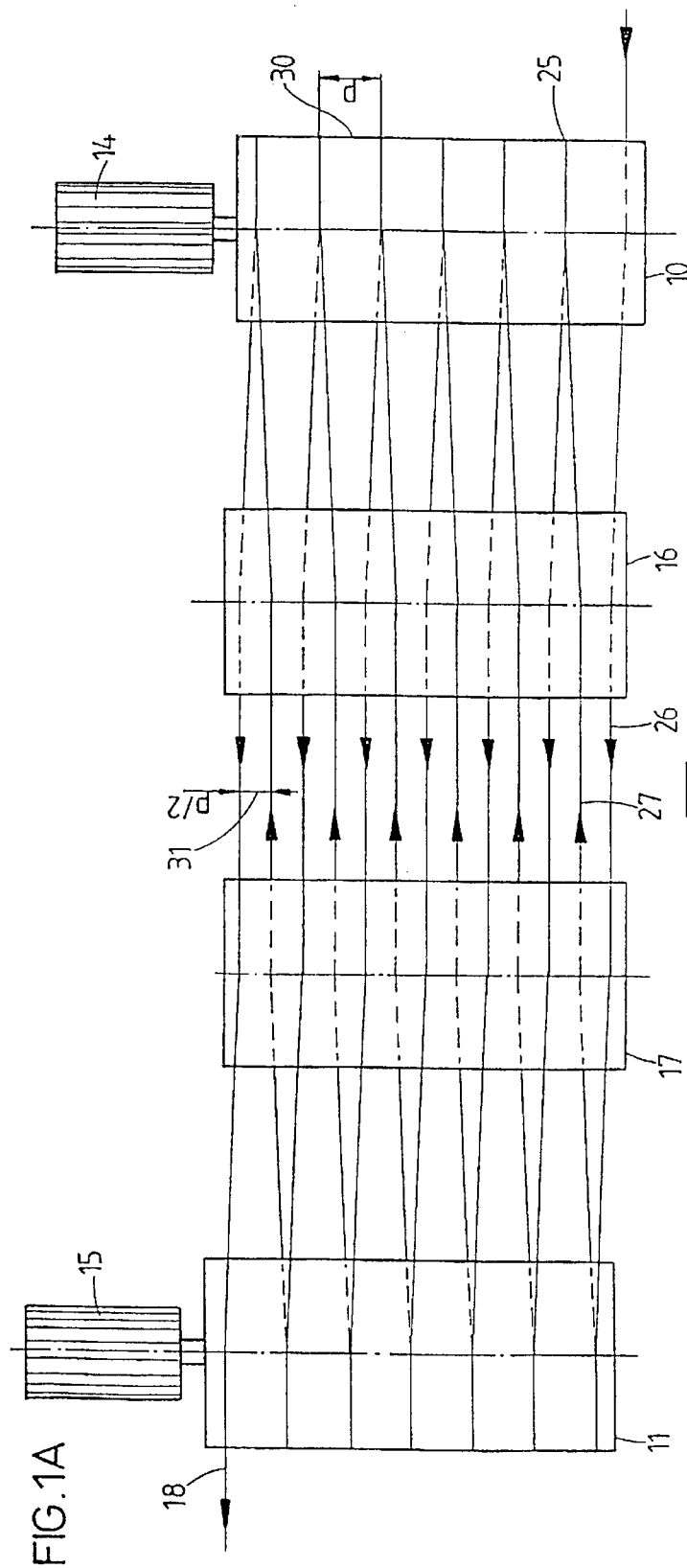
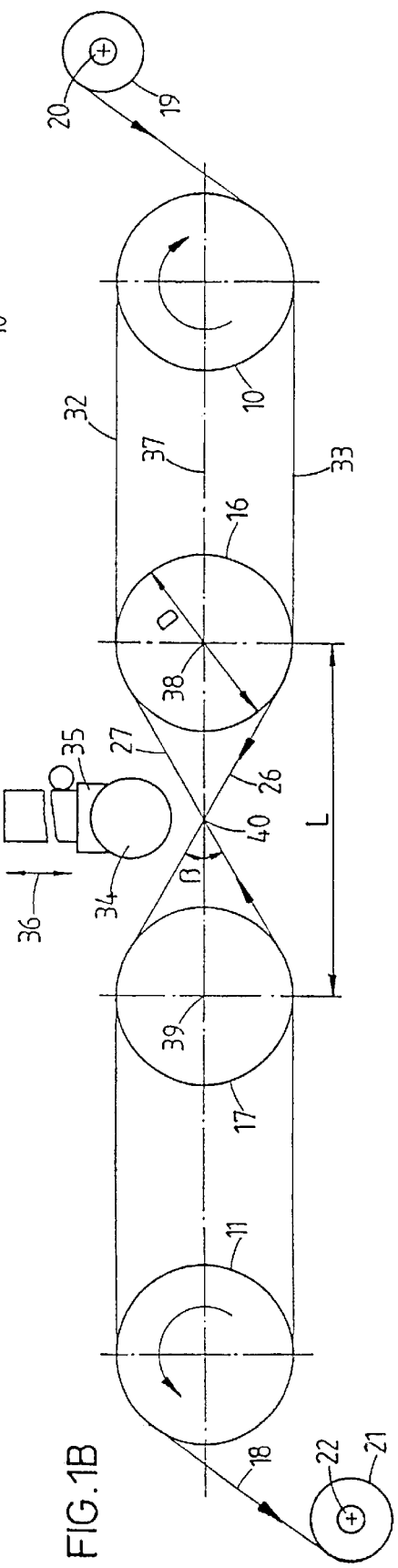
FIG.1A
FIG.1B

WIRE SAWING DEVICE FOR CUTTING FINE SLICES USING ANGULAR CROSSING OF AT LEAST TWO SAWING YARN LAYERS

FIELD OF THE INVENTION

The present invention relates to a wire sawing device comprising wire guide cylinders supporting a wire maintained in position by grooves provided on the surface of said wire guide cylinders which define the interval between the wires of a layer of wires, the wire being adapted to move with alternating or continuous movement bearing against at least one piece to be sawed fixed on at least one support table.

BACKGROUND OF THE INVENTION

There are known such devices for cutting thin slices from a piece to be sawed, in which the stretched wire is both guided and tensioned by the wire guide cylinders. These wire guide cylinders are generally covered with a layer of synthetic resin and are scored with grooves whose geometry and size must be very precise. The wire is spirally wound about wire guide cylinders and forms between two wire guide cylinders at least one layer of parallel wires whose distance between two consecutive wires fixes the thickness of the slices. Because of the spiral winding, all the wires of the layer of wires move parallel generating a force perpendicular to the advance of the support table and inducing shearing and torsion forces on the mechanism for holding the piece to be sawed. These forces are a function of the speed of sawing and the dimensions of the piece to be sawed and can be sufficiently great to wrench the piece to be sawed from its support. The tension produced at the base of the piece to be sawed gives rise to deformations which after sawing show up in the form of warping of the obtained slices. Moreover, the plane of the layer of wires is, in the known devices, generally perpendicular to the direction of sawing, which induces undulations on the surface of the slices in the case of overall movement of the layer of wires resulting from thermal oscillations for example. These undulations, even of several micrometers, are enough to render the slices unusable for certain applications such as silica for the semiconductor industry.

SUMMARY OF THE INVENTION

The object of the invention consists in overcoming the mentioned drawbacks by permitting the wire sawing device to produce slices of better geometric quality by decreasing the undulations and the warpage of the latter whilst improving the productivity of the assembly. The device according to the invention is characterized to this end, by the fact that it comprises at least four wire guide cylinders arranged in sequence one following the other with two outer wire guide cylinders and at least two inner wire guide cylinders, the wire being arranged on the outer wire guide cylinders at a first interval and on the inner wire guide cylinders at a second interval corresponding to half the first interval, the wire from a first groove on an inner wire guide cylinder passing into a groove of the outer wire guide cylinder to be returned to a second groove on the inner wire guide cylinder spaced from the second interval of the first groove, the wire coacting with the adjacent inner wire guide cylinders by passing from the first upper portion, respectively the lower portion, of one of the inner wire guide cylinders in a direct line to the lower portion, respectively the upper portion, of the adjacent inner wire guide cylinder so as to constitute an X arrangement formed by two layers of wires that cross at a crossing angle at least equal to 20° and determined by the diameter of the inner wire guide cylinders and by the spacing separating the axes of the two adjacent inner wire guide cylinders.

There are thus obtained two layers of wires forming a sufficient angle with the cutting direction and whose wires are projected on a working plane defined by the strictly parallel axes of the inner wire guide cylinders, such that the surfaces of the sawed slices will also be parallel. The crossing of the layers at an angle of at least 20° will reduce the problem of undulations because the latter will no longer be parallel but will be angularly different on opposite sides of the obtained slices, which can reduce, simplify or even render unnecessary, the subsequent operations of grinding or truing. The use of at least two inner wire guides permits providing in a simple manner, by winding of the crossed wire in an X arrangement, the two sawing directions with a sufficient angle to create the required effect so as to decrease the problem of possible undulations. It is particularly important to note that in this arrangement, the shear forces induced in the support by the two layers having very different angular directions from the sawing direction, hence the advance of the support table, are considerably reduced. Moreover, the angular position of the layers of wires relative to the movement of the support table, and hence of the piece to be sawed, decreases the cutting pressure on the surface of the piece to be sawed and thereby permits a greater cutting speed, increasing at the same time the productivity of the wire sawing device.

Because the layers cross in an X arrangement while passing from the upper and lower portions of the inner wire guide cylinders, the distribution of the forces of the wires on the inner wire guide cylinders is well balanced. The forces on the bearings of the inner wire guide cylinders are thus low. The heat given off by these bearings will thus be decreased, which will permit an improvement of the geometry of the sawed slices. Moreover, there can be used roller bearings of smaller size.

The precision of the sawed slices is also improved because the inner wire guide cylinders are subjected to the smaller forces determining the position of the wires of the crossing layers of wires, whilst the outer wire guide cylinders are subjected to large directional forces that do not influence the position of the wires, but serve for driving.

The necessary angle between the two layers must be at least 20° if it is desired to obtain a substantial crossing effect. However, beyond 90° the advantage of crossing layers decreases.

Because the layers of crossed wires are stretched in a direct line between the adjacent inner wire guide cylinders to form an X-shaped arrangement, therefore without passing through a guide member such as a guide or deflection cylinder, there is obtained a large crossing angle of the layers and a very good alignment and optimum parallelism of the wires of a layer.

Given that the wires are arranged on the inner wire guide cylinders at an interval corresponding to half that of the outer wire guide cylinders which return the wire received from a groove of the inner wire guide cylinder to a distant groove of a half interval on the inner cylinder, the wires are arranged on the inner wire guide cylinder such that their projections on the working plane are perfectly parallel. Slices with parallel surfaces are thus obtained in a simple manner with the layers crossed at a large crossing angle, greater than or equal to 20°.

The invention thus permits providing a superior wire sawing device having high productivity, a mean precision increased by the decrease of geometric faults and the decrease of the internal tensions in the course of sawing in the piece to be sawed which is often of a material very sensitive to external forces.

According to a preferred embodiment, the device comprises n inner wire guide cylinders arranged in a sequence following each other, n being a whole number equal to or greater than 2, the wire coacting with the inner wire guide cylinders so as to obtain (n−1) crossings of wire layers, (n=1) pieces to be sawed being adapted to be applied against the crossed wire layers substantially adjacent their crossing.

Preferably, n is comprised between 3 and 6.

With these arrangements there is obtained simultaneously a substantial number of advantages. Instead of having a ratio of the number of inner wire guide cylinders to the number of pieces to be sawed equal to 2, this ratio can be considerably reduced, namely to 1.5, 1.33, 1.25 or 1.2, for respectively 3, 4, 5 or 6 inner wire guide cylinders. There is thus obtained a ratio of the wear of the coating of the wire guide cylinders to the number of sawed pieces which is increasingly small and is advantageous. Of course the number of wire guide cylinders cannot be increased indefinitely because of the problems of overall size. Given that the device is capable of sawing several pieces simultaneously, there is obtained a considerable gain in productivity. Simultaneously important advantages are enjoyed because of the crossed layers of wires.

According to a preferred embodiment, the inner wire guide cylinders are arranged in a plane and the support tables are actuated by a common control member.

Because of this arrangement, there is obtained a particularly simple and effective arrangement which requires only a single control member.

According to a modification, each support table is adapted to be moved individually toward the layers of crossed wires or moved away from these, by electrical, pneumatic, hydraulic, magnetic and/or manual actuating means.

This arrangement permits precise sawing of pieces to be sawed of different sizes.

In these modifications, the centers of the axes of the wire guide cylinders can be arranged in a non-rectilinear arrangement.

These characteristics permit reducing the overall size as to the width of the entire device.

BRIEF DESCRIPTION OF THE DRAWINGS

Other advantages will be apparent from the following description of the invention in greater detail with the help of drawings which schematically and by way of example represent three embodiments and modifications.

FIGS. 1A and 1B show a first embodiment in a plan and frontal view.

DETAILED DESCRIPTION OF THE INVENTION

Figures 2A, 2B:
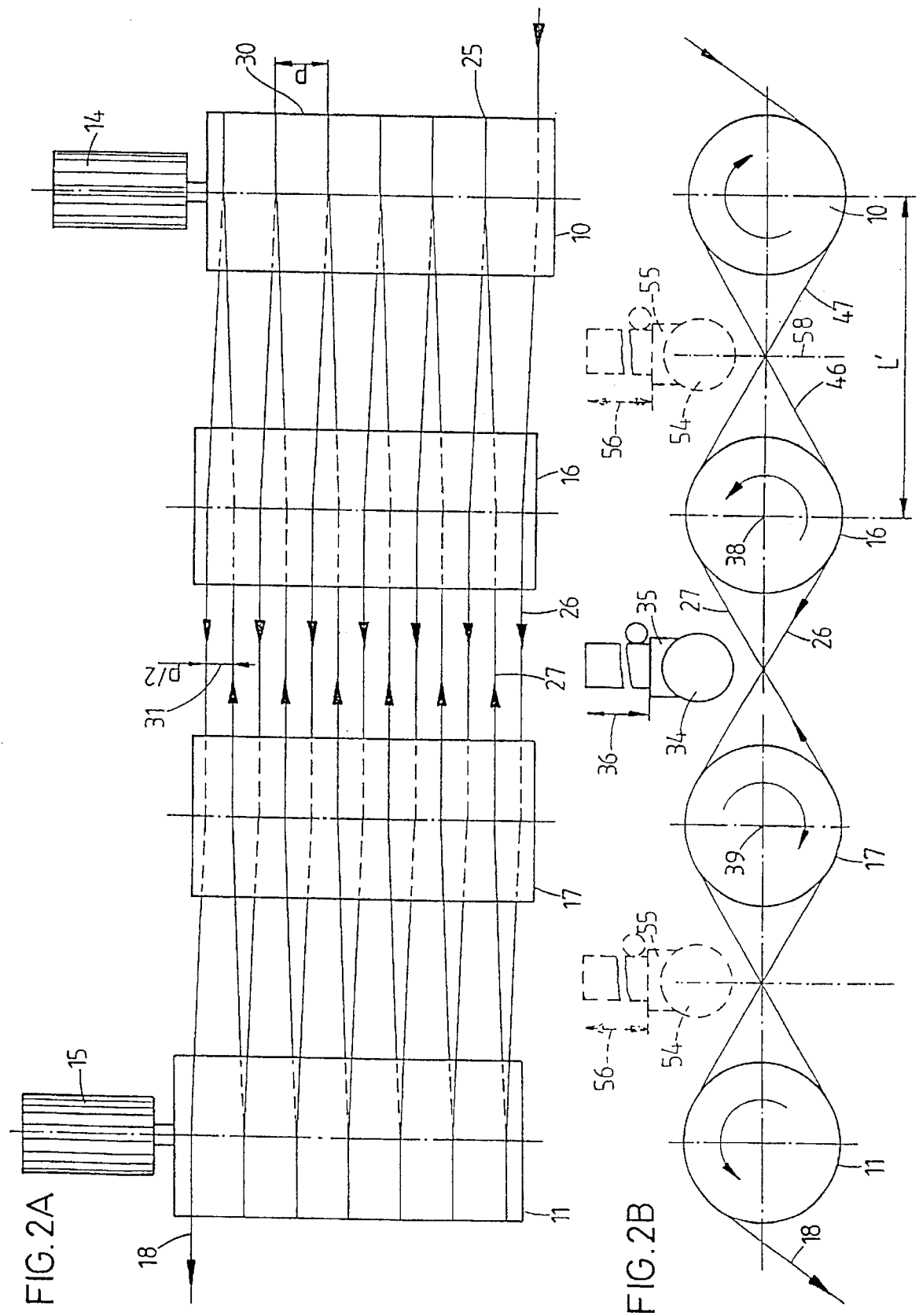
FIGS. 2A and 2B show plan and frontal views of a modification.

The first embodiment shown in FIGS. 1A and 1B comprises four wire guide cylinders of a machine or device for wire sawing. These cylinders are arranged in sequence following each other and comprise two outer wire guide cylinders 10, 11 driven by motors 14, 15 and two inner wire guide cylinders 16, 17 turned freely. Generally speaking, the wire 18 is unrolled from a supply bobbin 19 driven by a motor 20, then arranged on the wire guide cylinders and then rewound on a receiving bobbin 21 driven by a motor 22. The wire guide cylinders support the wire 18 and hold it by grooves 25 provided in their surface. The wire is adapted to move with an alternating and/or continuous movement.

The winding of the wire on and about the four wire guide cylinders is special in the sense that the wire is arranged on the outer wire guide cylinders 10, 11 with a first interval 30 of a value P and on the inner wire guide cylinders 16, 17 with a second interval 31 corresponding to half, or P/2, of the first interval.

The wire 18 thus passes from a first outer wire guide cylinder 10 to the lower portion of a first inner wire guide cylinder 16. Then it passes in a direct line to the upper portion of the second inner wire guide cylinder 17 and thence to the second outer wire guide cylinder 11 to the lower portion of the second inner wire guide cylinder 17 where it occupies a groove spaced by the interval 31. It then passes in a direct line to the upper portion of the first inner wire guide cylinder 16 there to be sent to the first outer wire guide cylinder 10. It thus forms between the two inner wire guide cylinders 16, 17 an X arrangement formed by two layers of wires 26, 27 that cross at a crossing angle β which is at least equal to 20° and is determined by the diameter D of the inner wire guide cylinders and the spacing L separating the axes 38, 39 of these inner wire guide cylinders.

The two layers of wires 32, 33 connecting the outer wire guide cylinders 10, 11 to the inner wire guide cylinders 16, 17 do not cross.

The piece 34 to be sawed is fixed on a support table 35 which can be moved in a direction 36 perpendicular to the working plane 37 defined by the two axes 38, 39 of the inner wire guide cylinders 16, 17. This piece 34 to be sawed can thus be brought to bear against the two crossing layers 26, 27 perpendicularly to the crossing line 40 of these two layers.

FIG. 1A clearly shows that the projections in the plane of the wires 18 of the two crossed layers 26, 27 are perfectly parallel between the two inner guide cylinders 16, 17 and space by an interval 31 of a value P/2. There are thus obtained sawed slices of a thickness P/2 decreased of course by the diameter of the wire 18 coated with abrasive. On the other hand, the interval 30 between the wires of the outer wire guide cylinders 10, 11 is of a value P and the projections in the plane of the wires are not parallel between the outer wire guide cylinders and inner wire guide cylinders.

Because of the balanced distribution of the forces acting on the inner wire guide cylinders 16, 17, the roller bearings of these latter can be smaller and less heat will be The modification shown in FIGS. 2A and 2B differs from the preceding embodiment, only by the fact that he layers of wires 32, 33 located between the outer wire guide cylinders 10, 11 and inner wire guide cylinders 16, 17 are no longer parallel, but also form crossing layers 46, 47. It is however to be seen in FIG. 2A that the projections in the plane of the wires are not parallel Thus, it is if desired possible to provide supplemental movable support tables 55 with pieces 54 to be sawed. But in the case in which it is desired that the sawed surfaces of the slices be parallel, the direction of movement 56 will not be perpendicular to the working plane 37, but inclined by a predetermined angle δ in an adjustment plane 58 perpendicular to the working plane 37 and parallel to the axes 38, 39 of the wire guide cylinders. This angle could be computed as a function of the interval 31, of the diameter D of he wire guide cylinders and the distance L' separating the axes of the inner and outer wire guide cylinders.

It is thus to be emphasized that the distribution of the forces acting on the inner wire guide cylinders 16, 17 is in this arrangement even better, which can contribute favorably to the precision of the obtained slices.

Figure 3A:
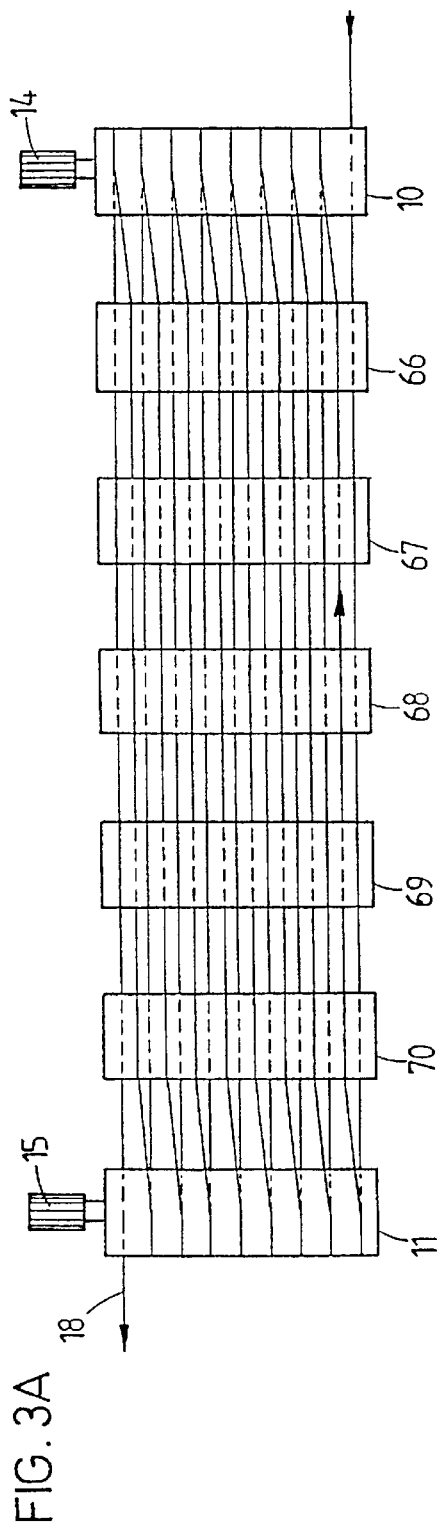
FIGS. 3A and 3B are plan and frontal views of a second embodiment.
Figure 3B:

The embodiment shown in FIG. 3A and 3B differs from the first embodiment by the fact that it comprises n=5 inner wire guide cylinders 66 to 70, arranged in a sequence following each other between the outer wire guide cylinders 10, 11 driven by the motors 14, 15.

There is thus obtained (n−1)=4 crossings of the layers of wires. (n−1)=4 pieces 34 to be sawed mounted on support tables 35 can thus be applied against the crossed layers of wires substantially adjacent their crossing. Of course n could be different from 5 and preferably chosen between 3 and 6.

The inner wire guide cylinders 66 to 70 are arranged in a plane and the support tables 35 actuated by a common control member 71. This latter comprises, for example, a connecting bar 72 connecting the support tables and a rack and pinion mechanism and an electric motor 73 adapted to move simultaneously all the support tables in the direction 36 perpendicular to the working plane.

Figure 3C:
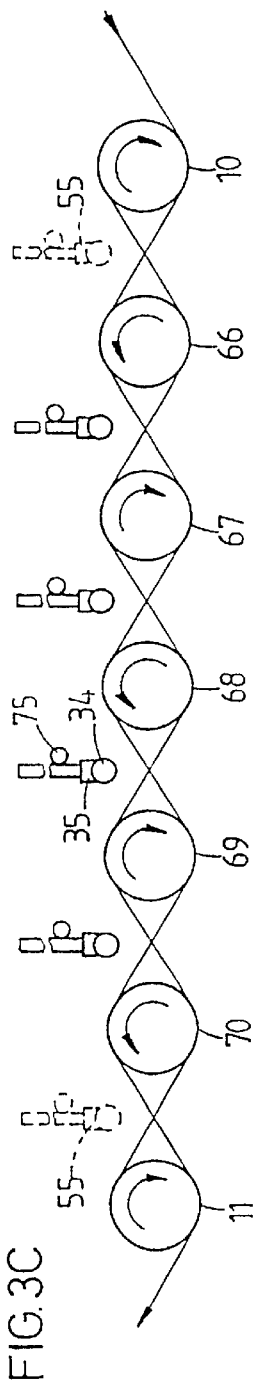
FIG. 3C shows a modification of the second embodiment in frontal view.

The modification illustrated in FIG. 3C differs from the preceding embodiment, by the fact that each support table 35 is driven by an individual drive mechanism 75. It is thus possible to saw simultaneously pieces 34 of different dimensions. Moreover, supplemental support tables 55 could be provided as was described with reference to FIGS. 2A and 2B.

Figure 4:
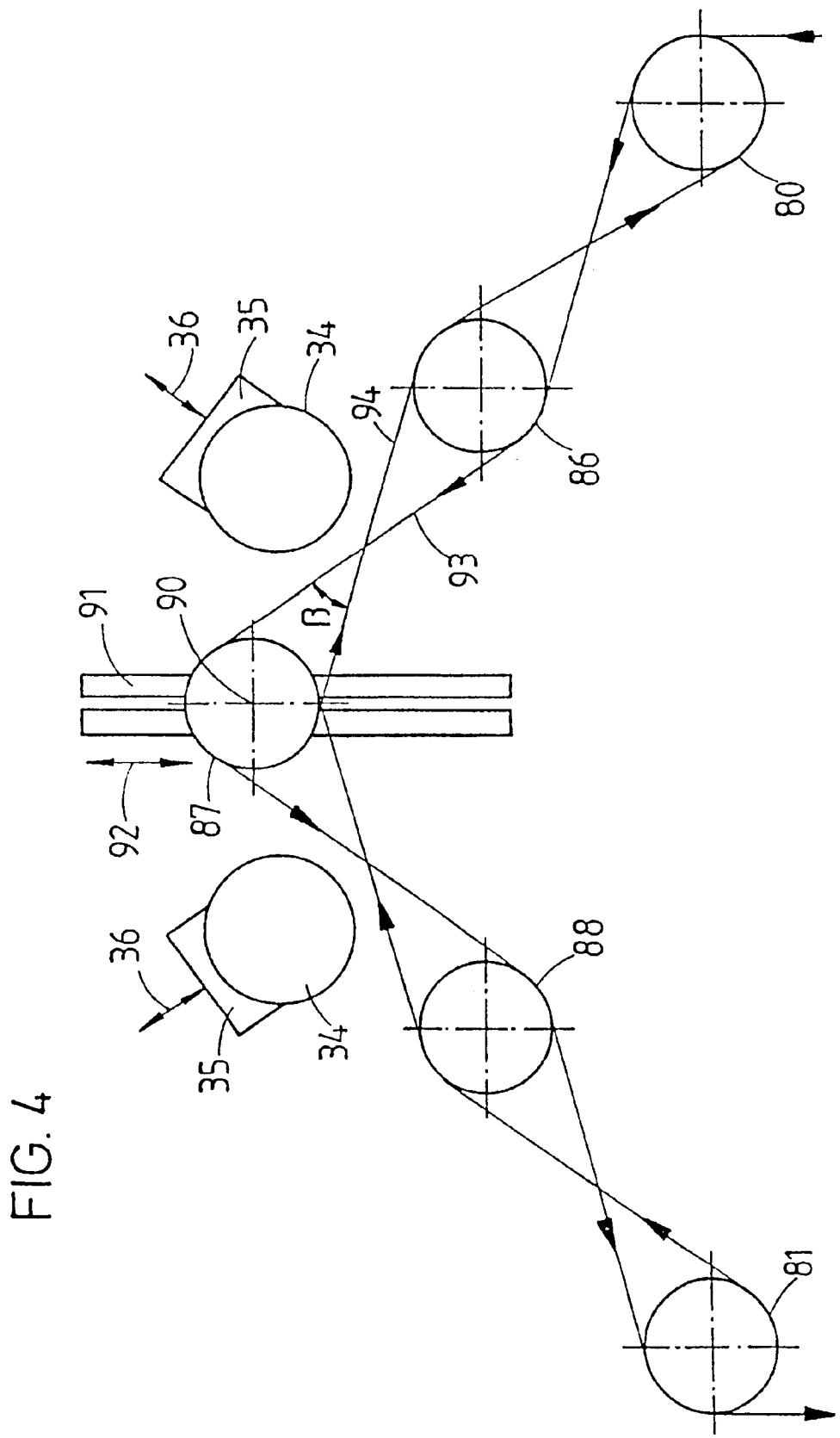
FIG. 4 is a frontal view of a third embodiment.

The embodiment shown in FIG. 4 comprises wire guide cylinders which are not arranged in a plane. The axes 90 of the cylinders could have any possible configuration, in the arc of a circle, triangular, polygonal, etc.

In the case of FIG. 4, the device comprises two outer wire guide cylinders 80, 81 and three inner wire guide cylinders 86, 87, 88 of generally triangular configuration. The wire guide cylinder 87 at the center forms the apex of the triangle. It is movably mounted on a frame 91. Thus, by movement of this central cylinder 87 in the direction 92, it is possible to cause the crossing angle θ between the crossed layers of wires 93, 94 to vary. The movement of the central cylinder 87 could be carried out by any manual, electrical, pneumatic or hydraulic means. The other elements of this embodiment remain as to all points similar to what has been described above.

The sawing wire forming the crossed layers of wires between the wire guide cylinders is constituted of spring steel of a diameter comprised between 0.1 and 0.2 mm so as to saw blocks of hard material or more particular compositions, such as silica, ceramics, compounds of elements from groups III–V, GGG (gadolinium gallium garnet), sapphire, etc., in slices of about 0.1 to 0.5 mm thickness. The abrasive agent is a commercial product and can be diamond, a silicon carbide, alumina, etc., in a form fixed to the wire or in the form of a loose slip.

Thus, according to the present invention comprising a winding with different spacing over the outer and inner wire guide cylinders, it is possible to obtain crossing layers of wires with a large crossing angle and parallel wires in projection, whilst having an advance of the support table or tables perpendicular to the working plane. The problem of undulations of the slices obtained is thus reduced, or even overcome. The shear forces induced in the support table and the cutting pressure on the surface of the piece to be sawed are considerably reduced. The forces on the inner wire guide cylinders are in large part compensated, smaller roller bearings could accordingly be used. The heat given off by the bearings of the inner wire guide cylinders is also reduced, from which improved precision of the obtained slices results.

The concept of multiple crossing layers of wires as disclosed with reference to FIGS. 3A, 3B, 3C and 4 permits moreover other supplemental advantages, such as a gain of productivity and reduced wear on the wire guide cylinders for a given number of pieces to be sawed.

Of course the embodiments described above are in no way limiting and they could have any desirable modification within the scope defined by the claim. In particular, other types of geometric arrangements of the wire guide cylinders could be envisaged, such as square, polygonal, circular, etc. arrangements. The movement of the support tables could be effected by any mechanical, electrical, pneumatic, hydraulic, etc. means. Instead of driving the two outer wire guide cylinders, it would also be possible to drive only one of the outer wire guide cylinders. In devices with a large number of inner wire guide cylinders, there could also be provided a drive of at least a portion of the inner wire guide cylinders, the others turning freely.

What is claimed is:

1. A wire sawing device comprising:

wire guide cylinders supporting a wire maintained in position by grooves provided on a surface of the wire guide cylinders which define an interval between the wires of a layer of wires, the wire being adapted to move with alternating or continuous movement while bearing against one piece to be sawed fixed on a support table;

wherein the wire guide cylinders comprise at least four wire guide cylinders arranged in a sequence following each other with two outer wire guide cylinders and at least two inner wire guide cylinders;

the wire being arranged on the outer wire guide cylinders at a first interval and on the inner wire guide cylinders at a second interval corresponding to half the first interval, the wire from a first groove on an inner wire guide cylinder passing to a groove of the outer wire guide cylinder to be returned to a second groove on the inner wire guide cylinder spaced by the second interval from the first groove;

and the wire coacting with adjacent inner wire guide cylinders and passing from an upper portion, respectively to a lower portion, of one of the inner wire guide cylinders in direct alignment with the lower portion, respectively the upper portion, of an adjacent inner wire guide cylinder so as to constitute an "X" arrangement formed of two layers of wires crossing at a crossing angle at least equal to 20° and determined by a diameter of the inner wire guide cylinders and by a spacing separating the axes of two adjacent inner wire guide cylinders.

2. The device according to claim 1, wherein the inner wire guide cylinders comprise n inner wire guide cylinders arranged in series one following the other, n being a whole number equal or greater than 2, the wire coacting with the inner wire guide cylinders so as to obtain n−1 crossings of wire layers, n−1 pieces to be sawed being adapted to be applied against layers of crossing wires substantially adjacent their crossing and further comprising a support table for each piece to be sawed.

3. The device according to claim 2, wherein n is between 3 and 6.

4. The device according to claim 3, wherein the inner wire guide cylinders are arranged in a plane and further comprising a common control member for actuating each of the support tables.

5. The device according to claim 4, wherein the common control member comprises a connecting bar connecting the support tables to actuating means to move simultaneously all the support tables in a direction perpendicular to the plane.

6. The device according to claim 5, wherein the actuating means is selected from the group consisting of electrical actuating means, pneumatic actuating means, hydraulic actuating means, magnetic actuating means and manual actuating means.

7. The device according to claim 3, further comprising an actuating means for moving each support table toward or away from the crossed layers of wires.

8. The device according to claim 7, wherein the actuating means is selected from the groups consisting of electrical actuating means, pneumatic actuating means, hydraulic actuating means, magnetic actuating means and manual actuating means.

9. The device according to claim 1, further comprising a motor for driving at least one of the outer wire guide cylinders, while the inner wire guide cylinders turn freely.

10. The device according to claim 1, wherein the outer wire guide cylinders are connected to adjacent inner wire guide cylinders by two parallel layers of wire.

11. The device according to claim 1, wherein the outer wire guide cylinders are connected to adjacent inner wire guide cylinders by two crossing layers of wire.

12. The device according to claim 1, wherein the axes of the wire guide cylinders are arranged in a non-planar alignment.

13. The device according to claim 1, further comprising means to modify the crossing angle arranged to move at least one wire guide cylinder.

14. The device according to claim 1, further comprising support tables arranged between the inner and outer wire guide cylinders and adjustment means to adjust an angle of inclination between a direction of movement of the support tables relative to the layers of wires and to a perpendicular to a working plane in which are contained the axes of two adjacent inner and outer wire guide cylinders, the angle of inclination being determined and adjusted so as to obtain slices with parallel surfaces.

* * * * *